United States Patent
Barrenscheen et al.

(10) Patent No.: US 7,133,979 B2
(45) Date of Patent: Nov. 7, 2006

(54) METHOD OF TRANSFERRING DATA BETWEEN A FIRST DEVICE AND A SECOND DEVICE WHILE MANIPULATING AT LEAST ONE QUANTITY IN DEPENDENCE ON AN ADDRESS

(75) Inventors: Jens Barrenscheen, München (DE); Hans Sulzer, Erding (DE); Gunther Fenzl, Höhenkirchen-Siegertsbrunn (DE)

(73) Assignee: Infineon Technologies AG, Munich (DE)

( * ) Notice: Subject to any disclaimer, the term of this patent is extended or adjusted under 35 U.S.C. 154(b) by 651 days.

(21) Appl. No.: 10/008,113

(22) Filed: Nov. 8, 2001

(65) Prior Publication Data
US 2002/0073267 A1 Jun. 13, 2002

(30) Foreign Application Priority Data
Nov. 8, 2000 (DE) ................ 100 55 175

(51) Int. Cl.
*G06F 13/00* (2006.01)

(52) U.S. Cl. ............... 711/154; 711/1; 711/111

(58) Field of Classification Search ............ 711/1, 711/111, 154
See application file for complete search history.

(56) References Cited

U.S. PATENT DOCUMENTS

| 5,053,951 A | 10/1991 | Nusinov et al. | |
| 5,732,234 A * | 3/1998 | Vassiliadis et al. | 712/200 |
| 6,493,803 B1 * | 12/2002 | Pham et al. | 711/147 |

FOREIGN PATENT DOCUMENTS

| DE | 36 40 670 A1 | 6/1988 |
| DE | 196 96 673 C1 | 4/1997 |

* cited by examiner

*Primary Examiner*—Reba I. Elmore
(74) *Attorney, Agent, or Firm*—Laurence A. Greenberg; Werner H. Stemer; Ralph E. Locher

(57) ABSTRACT

A method for transferring data between a first device and a second device is provided. In the method an address identifying the second device is output by the first device or an address generating device connected downstream thereof. An association between the address and the device addressed as a result, and/or the data that are to be transferred are manipulated, during the transfer, in dependence on the outputted address.

20 Claims, 2 Drawing Sheets

METHOD OF TRANSFERRING DATA BETWEEN A FIRST DEVICE AND A SECOND DEVICE WHILE MANIPULATING AT LEAST ONE QUANTITY IN DEPENDENCE ON AN ADDRESS

BACKGROUND OF THE INVENTION

Field of the Invention

The present invention relates to a method of transferring data between a first device and a second device.

Such a method is needed, inter alia, in program-controlled units such as microprocessors, microcontrollers, signal processors, and the like, in order that the command execution unit (the core or one of the cores of the program-controlled unit) executing the commands to be executed can fetch data stored in a memory device provided inside or outside the program-controlled unit and subject the data to the prescribed processing and, respectively, can write processed data or data obtained from elsewhere into that memory device.

Reading from or writing to the memory device can represent a very high loading for the program-controlled unit, in particular when very large amounts of data must be read or stored or—unless a particularly powerful program-controlled unit is used—may require the processing of the data read from the memory device or to be written into the memory device to be restricted.

SUMMARY OF THE INVENTION

It is accordingly an object of the invention to provide a method of transferring data between devices, which overcomes the above-mentioned disadvantages of the heretofore-known devices and methods of this general type and which enables reading from and writing to the memory device, and the processing of the data read from the memory device or to be written into the memory device, by a relatively simply constructed device, even when very large amounts of data are to be read out, stored and processed.

With the foregoing and other objects in view there is provided, in accordance with the invention, a method of transferring data between a first device and a second device, wherein an address is provided by the first device or by an address generating device connected downstream of the first device The provided address determines the second device. In order to transfer data between the first device and the second device, at least one of the following is manipulated in dependence on the address:

(1) the address itself; and/or
(2) an association between the address and the device addressed therewith; and/or
(3) data output by the first device, during a transfer to the second device; and/or
(4) data output by the second device, during a transfer to the first device.

In other words, an address, which is output by the first device or an address generating device connected downstream thereof, for determining the second device, and/or the association between this address and the device addressed as a result, and/or the data which is output by the first device, on the way to the second device, and/or the data which are output by the second device, on the way to the first device, are manipulated on the basis of the address output by the first device or the address generating device connected downstream thereof.

By means of the manipulation of the addresses the effort which has to be provided in the first device (for example in a core of the program-controlled unit) in order to address a second device (for example a memory device) which is to be read from or written to can be reduced; for example, by means of a burst access, that is to say with minimum effort for the first device, a repeated write or read access to the same address can be initiated, and/or access can be made repeatedly and alternately to two or more addresses.

As a result of the manipulation of the data, the latter can be preprocessed or post-processed outside the device processing the data (for example outside a core of the program-controlled unit).

Both measures relieve the load on the first device, so that reading from and writing to the second device and processing the data read from the second device or to be written into the second device can be brought about by a relatively simply constructed first device, even when very large amounts of data are to be read out, stored and processed.

In accordance with an added feature of the invention, the first device is the device initiating a transfer of data, a data-processing device, and/or the first device is a command execution unit belonging to a program-controlled unit.

In accordance with an additional feature of the invention, the second device is a data-storing device, a data-accepting device, a data-forwarding device, or a data-generating device.

In accordance with another feature of the invention, the second device is a memory device or a constituent part thereof.

Other features which are considered as characteristic for the invention are set forth in the appended claims.

Although the invention is illustrated and described herein as embodied in a method of transferring data between a first device and a second device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In the exemplary embodiment considered here implements the novel method in a program-controlled unit such as a microprocessor, a microcontroller, or a signal processor. It will be readily understood, however, that this is not intended to be a restriction, as the invention is also applicable to hard-wired logic units and the like.

In the exemplary embodiment, the program-controlled unit is used for encoding and decoding audio data. There is no restriction to this either; the program-controlled unit can also be used for any other desired purposes.

The method described below is used in the present case for transferring data between a command execution unit which executes the commands belonging to a program and belongs to the program-controlled unit (the core or one of the cores of the program-controlled unit), and a memory device provided inside the program-controlled unit. However, there is no restriction to this either: the component initiating the data transfer can also be any other desired component in the program-controlled unit, and the memory device can also be provided outside the program-controlled unit; instead of the memory device, another device, for example a device which "only" receives and forwards data, or a device that generates data, can be used.

The method described here is distinguished by the fact that an address, which is output by the first device or an address generating device connected downstream thereof, for determining the second device, and/or the association between this address and the device addressed as a result; and/or the data which are output by the first device, on the way to the second device, and/or the data which are output by the second device, on the way to the first device;

are manipulated on the basis of the address output by the first device or the address generating device connected downstream thereof.

It should also be understood that the manipulation of the address and/or the association between the addresses and the devices addressed as a result; and the manipulation of the data;

can be carried out independently of each other, that is to say individually or in combination.

Figure 1:
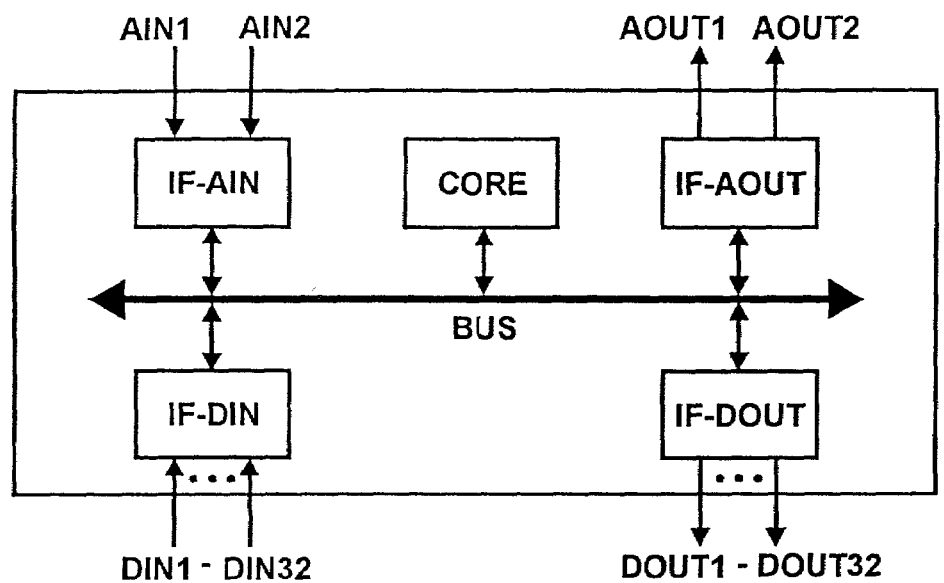
FIG. 1 is a schematic block diagram of a configuration wherein an address manipulation according to the invention is carried out.
Figure 2:
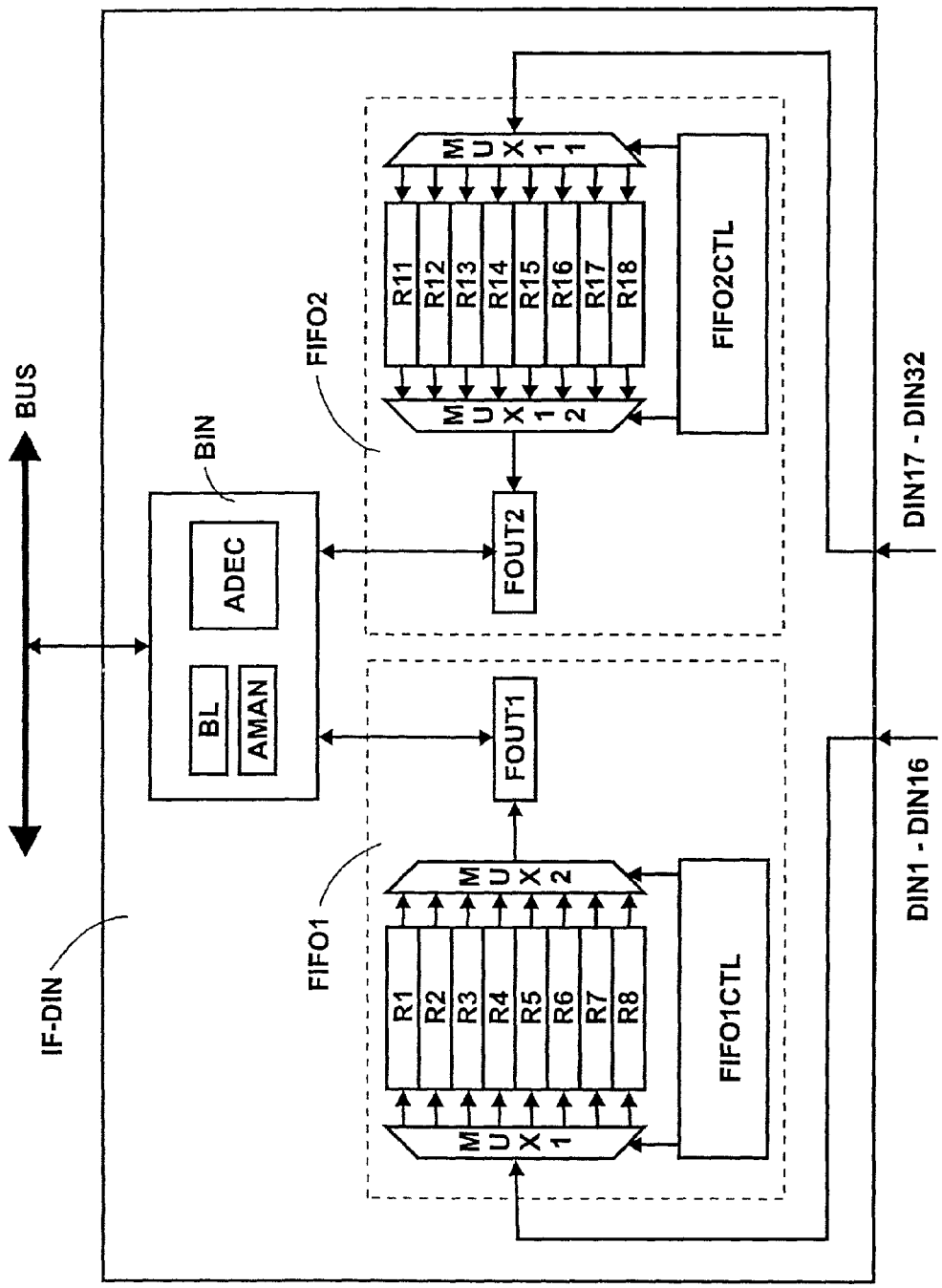
FIG. 2 is a detailed schematic view of the part of the configuration shown in FIG. 1 wherein the address manipulation is carried out.

Referring now to the figures of the drawing in detail and first, particularly, to FIGS. 1 and 2 thereof, there is illustrated an exemplary implementation of the method of manipulating the address output by the first device or an address generating device connected downstream thereof for determining the device to be read from or written to.

FIG. 1 shows the basic construction of a configuration wherein the novel method can be used. In the exemplary embodiment, the arrangement shown is a microcontroller specifically designed for encoding and decoding audio data.

The device includes the following parts:

IF-DIN: an interface for the input of digitized and compressed audio data into the microcontroller.

IF-DOUT: an interface for the output of digitized and compressed audio data from the microcontroller.

IF-AIN: an interface for the input of analog audio data into the microcontroller;

IF-AOUT: an interface for the output of analog audio data from the microcontroller;

CORE: a command execution unit executing the commands to be executed by the microcontroller; and Further devices, as appropriate, but not shown in the figure.

The various units are connected to one another by a bus BUS which comprises address lines for addressing the units to be addressed in each case, and data lines for transferring data between the units.

The interface IF-DIN receives digital encoded audio signals supplied to the program-controlled unit via input terminals DIN1 to DIN32, and makes them ready to be fetched by the command execution unit CORE.

The interface IF-DOUT receives digital encoded audio signals supplied to it by the command execution unit CORE and outputs them from the program-controlled unit via output terminals DOUT1 to DOUT32 of the latter.

The interface IF-AIN receives analog audio signals supplied to the program-controlled unit via input terminals AIN1 and AIN2, subjects said signals to A/D conversion, and makes them ready to be fetched by the command execution unit CORE.

The interface IF-AOUT receives digital audio signals supplied to it by the command execution unit CORE, subjects said signals to D/A conversion, and outputs them from the program-controlled unit via output terminals AOUT1 and AOUT2 of the latter.

The command execution unit CORE fetches from the interface IF-DIN the data made ready by the latter to be fetched, and supplies them to the interface IF-DOUT, and/or decodes them and supplies them to the interface IF-AOUT, or fetches from the interface IF-AIN the data made ready by the latter to be fetched, and supplies them to the interface IF-AOUT, and/or encodes them and supplies them to the interface IF-DOUT.

The encoding of the data consists, for example, in compressing the same.

The interfaces IF-DIN, IF-DOUT, IF-AIN and IF-AOUT each contain memory devices, wherein the data supplied to them and to be made ready to be fetched or to be output are buffered. In the example considered, these memory devices are formed by FIFOs and each of the interfaces in the present case contains two FIFOs (one for a left-hand audio channel, and one for a right-hand audio channel).

Referring now to FIG. 2, there is illustrated the structure of the interface IF-DIN in a schematic diagram.

The interface IF-DIN contains a bus interface BIN, a first FIFO memory FIFO1, a second FIFO memory FIFO2 and possible further components not shown in FIG. 2; the bus interface contains a burst logic unit BL, an address manipulation device AMAN, an address decoder ADEC and possibly further components not shown in FIG. 2.

Via the bus interface BIN, another of the units connected to the bus BUS can make a connection with the interface IF-DIN. Picking up the connection is carried out by the unit which wishes to make contact with the interface IF-DIN outputting one of the addresses associated with the interface IF-DIN onto the bus BUS. A plurality of addresses are associated with the interface IF-DIN; the various interfaces determine which action is carried out in the interface IF-DIN. In the example considered, the interface IF-DIN is assigned an address upon receipt of which the interface IF-DIN reads a value from the first FIFO memory FIFO1 and outputs it onto the bus BUS, is assigned an address upon receipt of which the interface IF-DIN reads a value from the second FIFO memory FIFO2 and outputs it onto the bus BUS, and is assigned further addresses upon receipt of which specific other actions are initiated in the interface IF-DIN (for example writing to function registers serving to configure the interface IF-DIN).

The bus interface BIF monitors whether actions are requested by the interface IF-DIN and, if necessary, initiates their execution.

Of interest in the present case is "only" the action of reading data stored in the FIFO memories FIFO1 and FIFO2 by the command execution unit CORE.

The FIFO memory FIFO1 comprises registers R1 to R8, a first multiplexer MUX1, a second multiplexer MUX2, a control device FIFO1CTL, and an output register FOUT1; the FIFO memory FIFO2 comprises registers R11 to R18, a first multiplexer MUX11, a second multiplexer MUX12, a control device FIFO2CTL, and an output register FOUT2.

As mentioned above, digital encoded audio data are supplied to the interface IF-DIN via the input terminals DIN1 to DIN32. Let it be assumed that the data via the input terminals DIN1 to DIN16 is assigned to a left-hand audio channel, and that the data via the input terminals DIN17 to DIN32 is assigned to a right-hand audio channel.

From the data supplied to the interface IF-DIN via the input terminals DIN1 to DIN32, the data supplied via the input terminals DIN1 to DIN16 is supplied to the first FIFO memory FIFO1, buffered there and made ready to be fetched by the command execution unit CORE. Put more precisely, the data supplied to the interface IF-DIN via the input terminals DIN1 to DIN16 is supplied to the first multiplexer MUX1 and, via the latter, written into one of the registers R1 to R8. The register to which the data is written depends on the way wherein the multiplexer MUX1 is driven. The data stored in the registers R1 to R8 is supplied to the second multiplexer MUX2 and, via the latter, forwarded to the output register FOUT1. The content of which of the registers R1 to R8 is supplied to the output register FOUT1 depends on the way wherein the multiplexer MUX2 is driven. The multiplexers MUX1 and MUX2 are driven by the control device FIFO1CTL; the control device FIFO1CTL controls the multiplexers MUX1 and MUX2 in such a way that the arrangement comprising the registers R1 to R8, the multiplexers MUX1 and MUX2, the output register FOUT1 and the control device FIFO1CTL operates like a FIFO memory.

The data supplied to the interface IF-DIN via the input terminals DIN17 to DIN32 is supplied to the second FIFO memory FIFO2, buffered there and made ready to be fetched by the command execution unit CORE. Put more precisely, the data fed to the interface IF-DIN via the input terminals DIN17 to DIN32 is supplied to the first multiplexer MUX11 and, via the latter, written to one of the registers R11 to R18. The register to which the data are written depends on the way wherein the multiplexer MUX11 is driven. The data stored in the registers R11 to R18 is supplied to the second multiplexer MUX12 and, via the latter, forwarded to the output register FOUT2. The content of which of the registers R11 to R18 is supplied to the output register FOUT2 depends on the way wherein the multiplexer MUX12 is driven. The multiplexers MUX11 and MUX12 are driven by the control device FIFO2CTL; the control device FIFO2CTL controls the multiplexers MUX11 and MUX12 in such a way that the arrangement comprising the registers R11 to R18, the multiplexers MUX11 and MUX12, the output register FOUT2 and the control device FIFO2CTL operates like a FIFO memory.

As mentioned above, the command execution unit CORE makes access to the interface IF-DIN at more or less regular intervals in order to read data stored in the FIFO memory FIFO1 or in the FIFO memory FIFO2. The command execution unit CORE in this case at least partly carries out those accesses to the interface IF-DWherein enable it, after outputting an address, designated below as the read start address, to read data from the interface IF-DIN by means of successive accesses to the latter, carried out without transmitting an address.

Such accesses are, for example, the burst accesses, as they are known.

In order to implement such accesses, in the example considered, the burst logic unit BL already mentioned and the address manipulation device AMAN, likewise already mentioned, are provided.

The burst logic unit BL in the example considered ensures that the command execution unit CORE can carry out a total of eight read accesses to the FIFO memory FIFO1 and/or FIFO2 in response to the output of an address to be interpreted as a read start address. For this purpose, the burst logic unit repeatedly (seven times in the example considered) carries out incrementing of an address supplied to it as start address and requests the reading of the data stored at the incremented addresses. Such burst logic units are known in a large number of embodiments and require no specific explanation.

As opposed to the normal use of burst logic units, in the example considered, however, the addresses generated and output by the burst logic unit BL are not used directly for memory device or storage element addressing, but are supplied to the address manipulation device AMAN, which manipulates them in a predefined manner.

The addresses manipulated by the address manipulation device AMAN are supplied to an address decoder ADEC, which sets up the connection with the interface component which is associated with the address supplied to the address decoder.

The manipulation of the addresses output by the burst logic unit is the precondition that a burst access can be made to a FIFO memory. This is because only a single address is in each case assigned to the FIFO memories, at least the simple FIFO memories, and the consequence of using an address differing from this address would be that no data could be read at all (if this different address is not associated with another memory device), or that data is read from a different memory device than the FIFO memory which is to be read.

The address manipulation device AMAN ensures, by means of the address manipulation it carries out, that, irrespective of the address output by the burst logic unit, in each case the memory devices or storage elements which are addressed are those which are actually to be read.

In the example considered, the address manipulation consists in specific address bits in the address output by the burst logic unit being set to fixed values and/or inverted and/or interchanged, it being possible for the aforementioned measures to be carried out independently of one another, individually or in any desired combination, and to be changed from read access to read access.

Some of the possibilities opened up by this will be described below by using examples. It is assumed here that the binary value 01000000 must be supplied to the address decoder as the address when data is to be read from the first FIFO memory FIFO1, and that the binary value 10000000 must be supplied to the address decoder as the address when data is to be read from the second FIFO memory FIFO2.

Let it be assumed that, in response to a single read request to the command execution unit CORE, eight read accesses are to be made to the FIFO memory FIFO1. In this case the command execution unit outputs the address 01000000 to the interface IF-DIN, the burst logic unit generates additional addresses 01000001, 01000010, 01000011, 01000100, 01000101, 01000110, and 01000111, and the address manipulation device sets the three least significant bits of the addresses supplied to it to the value 0.

As a result, the address decoder ADEC is supplied with the address 01000000 a total of eight times, which results in a total of eight read accesses to the FIFO memory FIFO1.

In a further example, let it be assumed that, in response to a single read request to the command execution unit CORE, read accesses to the first FIFO memory FIFO1 and to the second FIFO memory FIFO2 are to be made alternately. In this case the command execution unit outputs the address 01000000 to the interface IF-DIN, the burst logic unit generates additional addresses 01000001, 01000010, 01000011, 01000100, 01000101, 01000110, and 01000111, and the address manipulation device sets the three least significant bits of the addresses supplied to it to the value 0, and, in the case of each second read access, additionally interchanges the two most significant bits of the addresses supplied to it, or the command execution unit outputs the address 10000000 to the interface IF-DIN, the burst logic unit generates additional addresses 10000001, 10000010, 10000011, 10000100, 10000101, 10000110, and 10000111, and the address manipulation device sets the three least significant bits of the addresses supplied to it to the value 0, and, in the case of each second read access, additionally interchanges the two most significant bits of the addresses supplied to it.

As a result, the address decoder ADEC is supplied alternately with the addresses 01000000 and 10000000, which results in read accesses alternately to the first FIFO memory FIFO1 and the second FIFO memory FIFO2.

In a similar way, two or more successive read accesses can be made alternately to the first FIFO memory FIFO1 and the second FIFO memory FIFO2.

The address manipulation may be carried out particularly simply if care is taken that the addresses via which the FIFO memories FIFO1 and FIFO2 are addressed have specific values which are optimized with regard to the address modulation to be carried out.

If, for example, the address 00000000 is assigned to the first FIFO memory FIFO1, and the address 10000000 is assigned to the second FIFO memory FIFO2, and read accesses are to be made alternately to the first FIFO memory FIFO1 and the second FIFO memory FIFO2, then the command execution unit outputs the address 00000000 to the interface IF-DIN, the burst logic unit generates additional addresses 00000001, 00000010, 00000011, 00000100, 00000101, 00000110, and 00000111, and during each read access, the address manipulation device interchanges the most significant and the least significant bit of the addresses supplied to it and sets the three least significant bits of the addresses to the value 0, or the command execution unit outputs the address 10000000 to the interface IF-DIN, the burst logic unit generates additional addresses 10000001, 10000010, 10000011, 10000100, 10000101, 10000110, and 10000111, and during each read access, the address manipulation device interchanges the most significant and the least significant bit of the addresses supplied to it and sets the three least significant bits of the addresses to the value 0.

The address manipulation device AMAN and the burst logic unit BL make it possible for read accesses to be made in any desired number and in any desired order to two or more memory devices in response to a single read request to the command execution unit CORE.

This relieves the load on the command execution unit CORE and makes the processing of the data obtained easier.

The address manipulation device AMAN and the burst logic unit BL preferably operate independently of the address supplied to the interface IF-DIN by the command execution unit CORE. This makes it possible for the address manipulation device to become active only when an access is made to the FIFO memories FIFO1 and/or FIFO2, for the address manipulation device to permit the addresses supplied to it to pass unchanged in the case of accesses to other components of the interface IF-DIN, and for the burst logic unit BL also to be capable of being used for purposes other than accesses to the FIFO memories FIFO1 and FIFO2.

It should be clear that the use of an address manipulation device operating as described or otherwise also proves to be advantageous if writing to one or more memory devices is concerned, if memory devices other than FIFO memories have to be read from or written to, and/or if more or less than two memory devices have to be read from or written to.

Accordingly, the interfaces IF-DOUT, IF-AIN and IF-AOUT can have a structure corresponding to the structure of the interface IF-DIN.

Instead of the address manipulation device, an assignment manipulation device could also be provided, by means of which the association between the address output by the command execution unit CORE or that output by the burst logic unit BL, and the device addressed as a result is temporarily changed.

An exemplary embodiment relating to the manipulation of data transferred between a first device and a second device will now be described with reference to FIG. 3.

Figure 3:
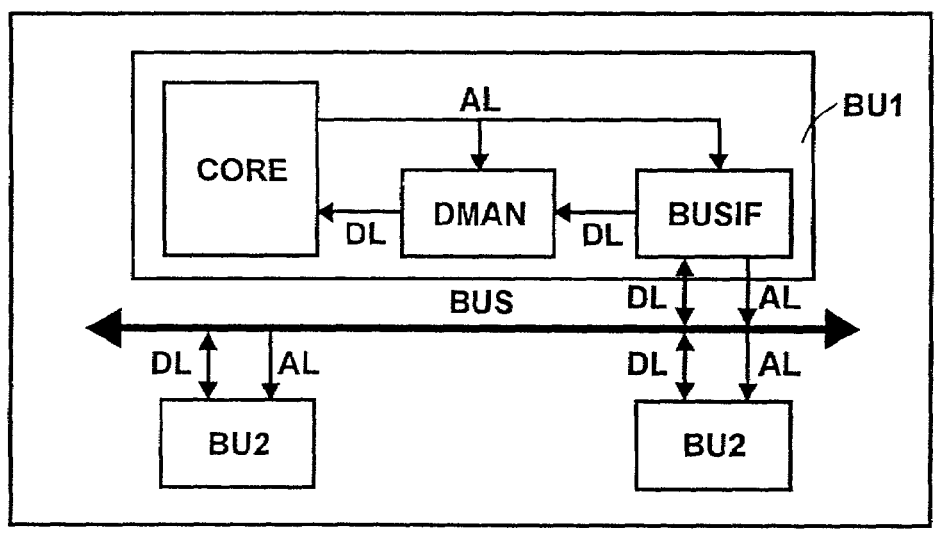
FIG. 3 is a schematic block diagram of a configuration wherein a data manipulation can be carried out during a data transfer.

The arrangement shown in FIG. 3 is a constituent part of a microcontroller and comprises three bus units BU1, BU2 and BU3, and a bus BUS that connects the bus units BU1, BU2 and BU3 to one another, the first bus unit BU1 containing a command execution unit (the core or one of the cores of the microcontroller) CORE, a bus interface BUSIF, and a data manipulation device DMAN.

The command execution unit CORE is able to transmit data to the bus units BU2 and/or BU3 and/or to request and accept data from the bus units BU2 and/or BU3.

The data source or the data destination is determined via an address output to the bus BUS by the command execution unit CORE via address lines AL and the bus interface BUSIF; the data to be transferred in response to a read or write request from the command execution unit CORE is transferred via data lines DL, the bus interface BUSIF, and the bus BUS.

On the way between the aforementioned components, the data transferred between the command execution unit CORE and the bus units BU2 and/or BU3 passes through the data manipulation device DMAN.

The data manipulation device DMAN is a logic circuit which subjects the data supplied to it to specific arithmetic and/or logic operations. The operations carried out on the data are preferably operations which can be executed by a simply constructed data manipulation device, for example shift operations, logic combinations, comparisons, etc. Then, by means of a simply constructed data manipulation device, preprocessing or post-processing which relieves the load on the command execution unit CORE can be carried out on the data to be stored or read.

The data manipulation device DMAN is controlled by means of the addresses transferred via the address lines AL or a selected part of the same. Therefore, via the address output by the command execution unit CORE, it is possible to determine whether and, if appropriate, how the data is to be manipulated.

The address or the part of the address by means of which the data manipulation device DMAN is controlled can also include an address part or be an address part which is not needed for addressing the unit determined as a result. This is possible, for example, if 16 address lines AL are provided but only an 8-bit address is needed for addressing the unit to be addressed.

In particular if the data manipulation device DMAN can be driven "only" by the addresses or address parts which are needed for addressing the data source or data sink to be addressed, it may prove to be advantageous if a plurality of addresses are assigned to the data sources or data sinks. Then, the data originating from such data sources or the data supplied to such data sinks can also be subjected to different processing.

In the example considered, the data manipulation device DMAN subjects the data supplied to it to all the operations which it can carry out, simultaneously; the address that controls the manipulation device controls "only" a multiplexer, by means of which it is decided which operation will have its result output. Of course, the data manipulation device can also be constructed in any other desired way.

Irrespective of this, provision can be made for the operations to be carried out by the data manipulation device DMAN to be carried out by using variable parameters or operands; these parameters or operands can preferably be varied dynamically by the command execution unit CORE or another device.

The operations which are carried out by the data manipulation device DMAN can lead to noticeable relief of the load on the command execution unit. This applies in particular (but not exclusively) when, as for example in the case of an arrangement of the type of FIG. 1, a very large amount of data is to be transferred and processed. Noticeable relieving of the load on the command execution unit results even when there are only a few and simple operations which are carried out in the data manipulation device DMAN, and/or when the data manipulation device DMAN is used only relatively infrequently. This is because operations which can be carried out quickly and simply by fixed-wired logic frequently require a comparatively very high amount of effort when carried out by a program.

The data manipulation device is preferably arranged in such a way that it is able to manipulate data originating from various data sources or transferred to various data sinks. In this way, it is possible for only a single or a few data manipulation devices to have to be provided. In the example considered, the data manipulation device is connected directly upstream or downstream of the command execution unit. A data manipulation device arranged in this way is able to manipulate as desired data originating from any desired data sources or transmitted to any desired data sinks.

However, it should be clear that a data manipulation device acting as described or in a similar way can also be connected upstream or downstream of other devices which, in response to their own or external initiation, are able to output data and/or receive data, that is to say for example are connected upstream or downstream of a memory device.

Furthermore, it should be clear that the data manipulation device is able to operate not only independently of the address but, additionally or alternatively, also independently of other variables, states and/or events.

By means of address and/or data manipulation as described or carried out in another way, it is possible for reading from and writing to a device, and the processing of the data read out or to be written in, to be brought about by a relatively simply constructed device even when very large amounts of data have to be read out, stored and processed.

We claim:

1. A method of transferring data between a first device and a second device, which comprises:
    outputting an address with the first device or with an address generating device connected downstream of the first device for determining the second device, the outputted address not being used directly for memory device or storage element addressing; and
    changing at least one of the following in dependence on the address:
        the address output by the first device or the address generating device;
        an association between the address and the device addressed therewith;
        data output by the first device, during a transfer to the second device; and
        data output by the second device, during a transfer to the first device.

2. The method according to claim 1, wherein the first device is the device initiating a transfer of data.

3. The method according to claim 1, wherein the first device is a data-processing device.

4. The method according to claim 1, wherein the first device is a command execution unit belonging to a program-controlled unit.

5. The method according to claim 1, wherein the second device is a device selected from the group consisting of a data-storing device, a data-accepting device, a data-forwarding device, and a data-generating device.

6. The method according to claim 1, wherein the second device is a memory device.

7. The method according to claim 1, wherein the second device is a constituent part of a memory device.

8. The method according to claim 1, wherein the changing step comprises manipulating at least one of the address and the association between the address and the device addressed therewith such that, instead of the device determined by the non-manipulated address, another device is used as the second device.

9. The method according to claim 1, wherein the changing step comprises manipulating at least one of the address and the association between the address and the device addressed therewith such that, in addition to the device determined by the non-manipulated address, a further device is used as the second device.

10. The method according to claim 1, wherein the changing step comprises manipulating one of the address and the association between the address and the device addressed therewith, such that, in response to a read or write request by the first device initiating successive accesses to various devices, accesses are made to devices which are not the devices whose reading or writing was requested by the first device.

11. The method according to claim 1, wherein the changing step comprises manipulating one of the address and the association between the address and the device addressed therewith, such that, in response to a read or write request by the first device initiating successive accesses to various devices, accesses are made to devices which are only partly the devices whose reading or writing was requested by the first device.

12. The method according to claim 1, wherein the changing step comprises manipulating one of the address and the association between the address and the device addressed therewith, such that, in response to a request by the first device for accesses to a plurality of different devices, access is made repeatedly to one or more devices.

13. The method according to claim 12, wherein the device to which access is made repeatedly is a FIFO memory device.

14. The method according to claim 1, wherein the changing step comprises manipulating one of the address and the association between the address and the device addressed therewith by setting specific parts of the address to a fixed value.

15. The method according to claim 1, wherein the changing step comprises manipulating one of the address and the association between the address and the device addressed therewith by interchanging one or more address bits thereof.

16. The method according to claim 1, which comprises transferring the data through a data processing device, and the changing step comprises manipulating the data with the data processing device during the transfer of the data.

17. The method according to claim 16, wherein the data processing device is a hard-wired logic unit.

18. The method according to claim 16, which comprises controlling the data processing device with the address output by the first device.

19. The method according to claim 18, which comprises controlling the data processing device completely or partly with portions of the address output by the first device left unconsidered by the device addressed with the address.

20. A method of transferring data between a first device and a second device, which comprises:

outputting an address with the first device or with an address generating device connected downstream of the first device for determining the second device; and changing at least one of the following in dependence on the address:

the address output by the first device or the address generating device;

an association between the address and the device addressed therewith;

data output by the first device, during a transfer to the second device;

data output by the second device, during a transfer to the first device;

the changing step including manipulating one of the address and the association between the address and the device addressed therewith by inverting one or more address bits thereof.

* * * * *